US00RE49161E

(19) United States
(12) Reissued Patent
Myre

(10) Patent Number: US RE49,161 E
(45) Date of Reissued Patent: Aug. 9, 2022

(54) WEIGHT SET SELECTOR AND LOCKING MECHANISM

(71) Applicant: VINTAGE GOLD HOLDINGS LIMITED, Wan Chai (HK)

(72) Inventor: Jake Myre, Beaver Dam, WI (US)

(73) Assignee: Vintage Gold Holdings Limited, Hong Kong (HK)

(21) Appl. No.: 17/139,473

(22) Filed: Dec. 31, 2020

Related U.S. Patent Documents

Reissue of:
(64) Patent No.: 10,166,427
Issued: Jan. 1, 2019
Appl. No.: 14/767,159
PCT Filed: Feb. 13, 2013
PCT No.: PCT/US2013/025906
§ 371 (c)(1),
(2) Date: Aug. 11, 2015
PCT Pub. No.: WO2014/126557
PCT Pub. Date: Aug. 21, 2014

(51) Int. Cl.
*A63B 21/072* (2006.01)
*A63B 21/062* (2006.01)
(Continued)

(52) U.S. Cl.
CPC .... *A63B 21/0728* (2013.01); *A63B 21/00065* (2013.01); *A63B 21/063* (2015.10);
(Continued)

(58) Field of Classification Search
CPC . A63B 21/0728; A63B 21/063; A63B 21/075; A63B 21/0726; A63B 21/072;
(Continued)

(56) References Cited

U.S. PATENT DOCUMENTS 5,346,448 A 9/1994 Sollo
5,769,762 A 6/1998 Towley, III et al.
(Continued)

FOREIGN PATENT DOCUMENTS

WO 2012058612 A1 5/2012

OTHER PUBLICATIONS

International Search Report and Written Opinion for PCT Application No. PCT/US2013/025096, Korean Intellectual Property Office, dated Nov. 18, 2013, 8 pages, Republic of Korea.
(Continued)

*Primary Examiner* — Terrence R Till
(74) *Attorney, Agent, or Firm* — Thompson Coburn LLP

(57) ABSTRACT

A selectable weight set apparatus includes a handle assembly including a handle having a first end portion and a second end portion opposite the first end portion. A first weight set is adapted to be supported on the first end portion of the handle and a second weight set is adapted to be supported on the second end portion of the handle. Each of the first and second weight sets includes a plurality of weight plates. An adjustment assembly selects a number of weight plates to be retained to the handle assembly. The adjustment assembly includes at least one selector for movement relative to at least one of the first and second weight sets to engage and select the weight plates in said at least one of the first and second weight sets. A locking assembly fixes the selector relative to said at least one of the first and second weight sets.

32 Claims, 19 Drawing Sheets

(51) Int. Cl.

| | |
|---|---|
| ***A63B 21/00*** | (2006.01) |
| ***A63B 21/075*** | (2006.01) |
| ***A63B 21/06*** | (2006.01) |
| ***A63B 71/00*** | (2006.01) |

(52) U.S. Cl.
CPC ..... *A63B 21/075* (2013.01); *A63B 21/0726* (2013.01); *A63B 21/0607* (2013.01); *A63B 2071/0081* (2013.01)

(58) Field of Classification Search
CPC ..... A63B 21/0722; A63B 21/0724; A63B 21/00065; A63B 21/00058; A63B 2071/0694; A63B 21/0605; A63B 21/0604
See application file for complete search history.

(56) References Cited

U.S. PATENT DOCUMENTS

| | | | | |
|---|---|---|---|---|
| 6,083,144 | A | 7/2000 | Towley, III et al. | |
| 6,149,558 | A | 11/2000 | Chen | |
| 6,196,952 | B1 | 3/2001 | Chen | |
| 6,228,003 | B1 | 5/2001 | Hald et al. | |
| 6,261,022 | B1 | 7/2001 | Dalebout et al. .... | A63B 21/075 482/107 |
| 6,500,101 | B1 | 12/2002 | Chen | |
| 6,540,650 | B1 | 4/2003 | Krull | |
| 6,758,795 | B2 | 7/2004 | Barber | |
| 6,899,661 | B1 * | 5/2005 | Krull ..... | A63B 21/075 482/107 |
| 7,090,625 | B2 | 8/2006 | Chermack | |
| 7,153,244 | B2 | 12/2006 | Towley, III et al. | |
| 7,264,578 | B1 | 9/2007 | Krull | |
| 7,335,142 | B2 | 2/2008 | Towley, III et al. | |
| 7,377,885 | B2 | 5/2008 | Doudiet | |
| 7,387,596 | B2 | 6/2008 | Towley, III et al. | |
| 7,491,155 | B2 | 2/2009 | Fenelon et al. | |
| 7,497,814 | B1 | 3/2009 | Krull | |
| 7,520,845 | B2 | 4/2009 | Towley, III et al. | |
| 7,547,268 | B1 | 6/2009 | Krull | |
| 7,578,772 | B2 | 8/2009 | Lippitt | |
| 7,611,448 | B2 | 11/2009 | Schiff | |
| 7,621,855 | B1 * | 11/2009 | Krull ..... | A63B 21/0728 482/107 |
| 7,862,487 | B2 | 1/2011 | Olson | |
| 8,007,415 | B1 | 8/2011 | Lundquist | |
| 2003/0096683 | A1 | 5/2003 | Fenelon et al. | |
| 2003/0114276 | A1 | 6/2003 | Schiff | |
| 2003/0148862 | A1 | 8/2003 | Chen et al. ..... | A63B 21/0726 482/108 |
| 2006/0025287 | A1 * | 2/2006 | Chermack ..... | A63B 21/075 482/107 |
| 2007/0037675 | A1 | 2/2007 | Doudiet | |
| 2008/0064575 | A1 | 3/2008 | Towley, III et al. | |
| 2008/0188362 | A1 | 8/2008 | Chen | |
| 2009/0163335 | A1 | 6/2009 | Towley, III et al. | |
| 2009/0197745 | A1 * | 8/2009 | Olson ..... | A63B 21/0728 482/107 |
| 2009/0305852 | A1 | 12/2009 | Höglund ..... | A63B 21/0728 482/107 |
| 2010/0229616 | A1 | 9/2010 | Fink et al. | |
| 2010/0304938 | A1 | 12/2010 | Olson | |
| 2010/0304940 | A1 | 12/2010 | Svenberg et al. .. | A63B 21/0728 482/108 |
| 2010/0323856 | A1 * | 12/2010 | Svenberg ..... | A63B 21/075 482/108 |
| 2012/0021877 | A1 | 1/2012 | Lundquist et al. | |
| 2013/0324375 | A1 * | 12/2013 | Svenberg ..... | A63B 21/0728 482/108 |

OTHER PUBLICATIONS

Extended European Search Report dated Sep. 28, 2016 in related application PCT/US2013/025906, 8 pages.

* cited by examiner

WEIGHT SET SELECTOR AND LOCKING MECHANISM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

The present invention generally relates to a selectable free weight assembly having an improved weight set selector and locking mechanism.

BACKGROUND

An adjustable weight dumbbell apparatus enables a user to have access to a plurality of differing weight sets in a single handset by facilitating the addition or subtraction of weight (i.e., weight plates) from the apparatus. In the past, the use of free weight dumbbells generally offered the user one of two options. The first option was a plurality of free weight dumbbells of solid mass in a sufficient number to fulfill the entire desired free weight requirement (i.e., multiple pairs of dumbbells). The second option was an adjustable dumbbell that required physically clamping or securing the weights to a handset using a hand wrench manual locking apparatus. More recently, adjustable dumbbells have incorporated different mechanisms for securing the weight plates to each other and to the handset.

During use, free weight assemblies are often dropped from elevated positions. And even though conventional adjustable weight assemblies employ various selector and locking mechanisms, the weight plates can still become disengaged when the assemblies are dropped. This can cause the weight plates to become detached from the handset and can result in permanent damage to the assemblies. Therefore, there exists a need for an adjustable weight assembly with an improved weight set selector and locking mechanism.

SUMMARY

In one aspect, a selectable weight set apparatus generally comprises a handle assembly comprising a handle having a first end portion and a second end portion opposite the first end portion. A first weight set is adapted to be supported on the first end portion of the handle and a second weight set adapted to be supported on the second end portion of the handle. Each of the first and second weight sets comprises a plurality of weight plates. An adjustment assembly selects a number of weight plates to be retained to the handle assembly. The adjustment assembly comprises at least one selector for movement relative to at least one of the first and second weight sets to engage and select the weight plates in said at least one of the first and second weight sets. A locking assembly fixes the selector relative to said at least one of the first and second weight sets. The locking assembly comprises a first locking element and a plurality of second locking elements. The first locking element is configured for releasable engagement with the selector and one of the plurality of second locking elements on the selector after the selector is moved to engage and select the weight plates in said at least one of the first and second weight sets.

In another aspect, a handle assembly for a selectable weight set apparatus generally comprises a handle for supporting a plurality of weight plates. An adjustment assembly is associated with the handle for selecting a number of weight plates to be retained to the handle. The adjustment assembly comprises at least one selector for movement relative to the handle to engage and select the weight plates to be retained to the handle. A locking assembly fixes the selector relative to the handle. The locking assembly comprises a first locking element and a plurality of second locking elements. The first locking element is configured for releasable engagement with the selector and one of the plurality of second locking elements on the selector to place the locking assembly in locked and unlocked configurations.

Other aspects of the present invention will be apparent in view of the following description and claims.

BRIEF DESCRIPTION OF THE DRAWINGS

Corresponding reference characters indicate corresponding parts throughout the drawings.

DETAILED DESCRIPTION OF THE DRAWINGS

Figure 1:
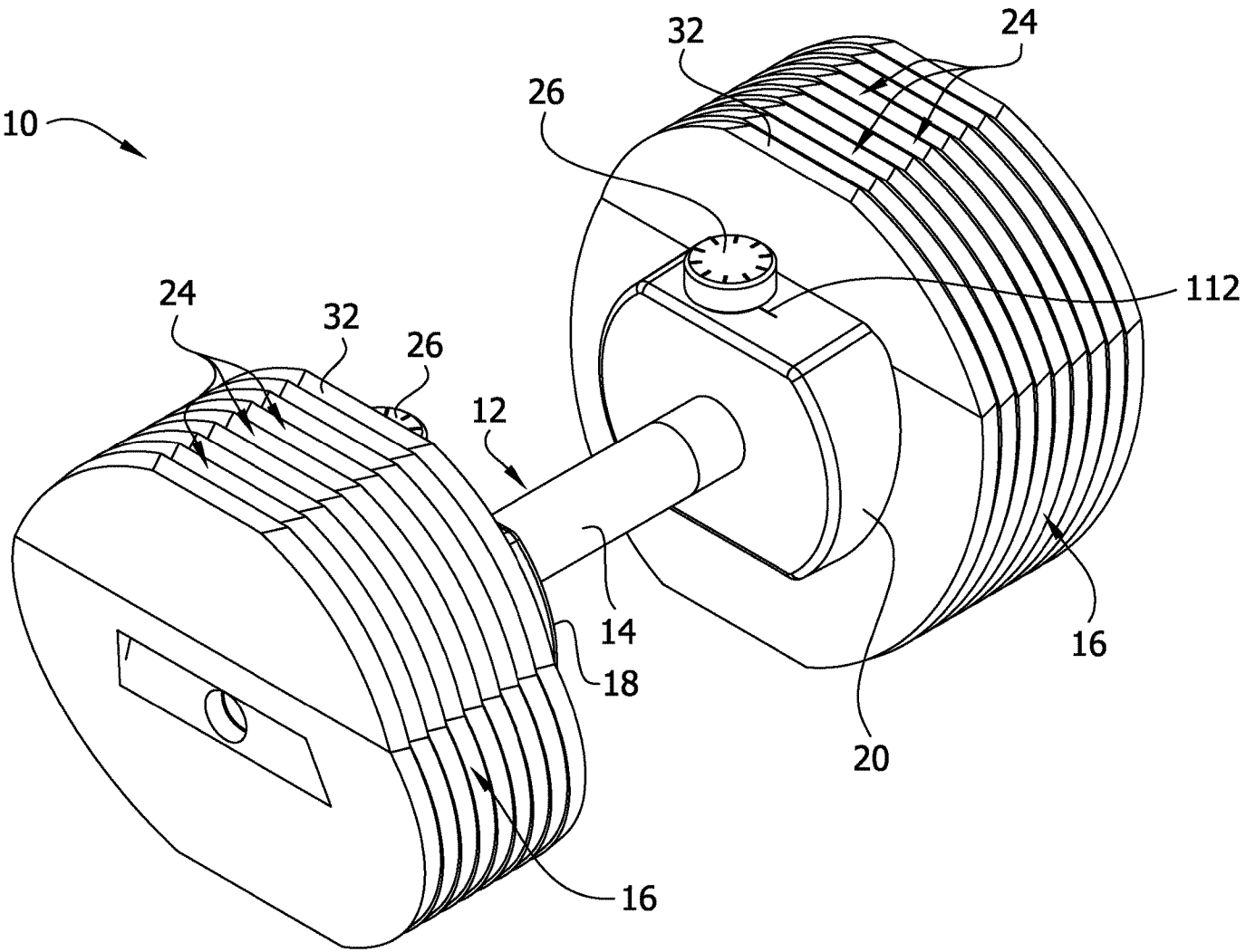
FIG. 1 is a perspective of a free weight dumbbell apparatus of the present invention.

Referring now to the drawings, and more specifically to FIGS. 1-4, a freestanding selectable free weight dumbbell apparatus 10 generally comprises a dumbbell handle assembly 12 including a tubular handle 14 and a pair of collars 18, 20 mounted on respective ends of the handle. A pair of weight plate sets 16 is supported by the handle assembly 12.

Each weight plate set 16 comprises a plurality of weight plates 24 arranged in mating sequence between respective collars 18, 20 and outermost weight plates 24. A knob 26 (broadly, "a selector element") is mounted on each collar 18, 20 to adjust the number of weight plates 24 in each respective set 16 supported by the handle assembly 12 for varying the total weight of the apparatus 10. A portion of the handle 14 extends between the collars 18, 20 for allowing a user to grasp and manipulate the apparatus 10.

Figure 5:
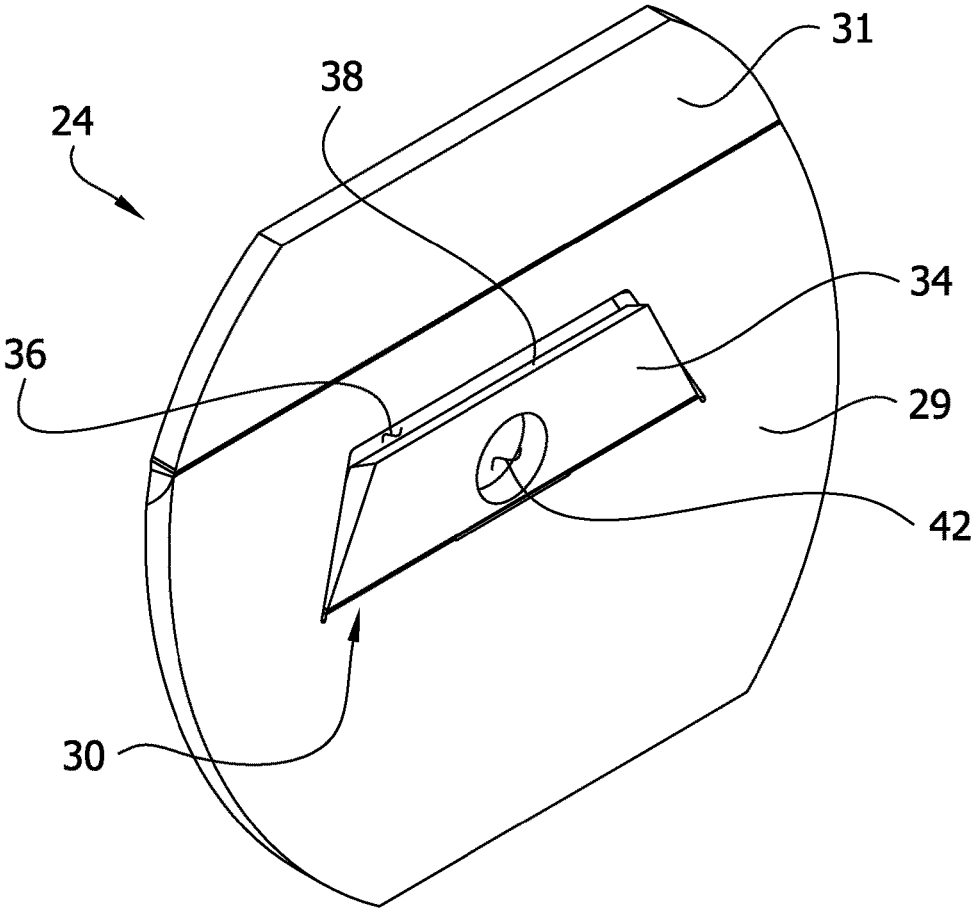
FIG. 5 is a perspective of a weight plate of the apparatus.
Figure 5A:
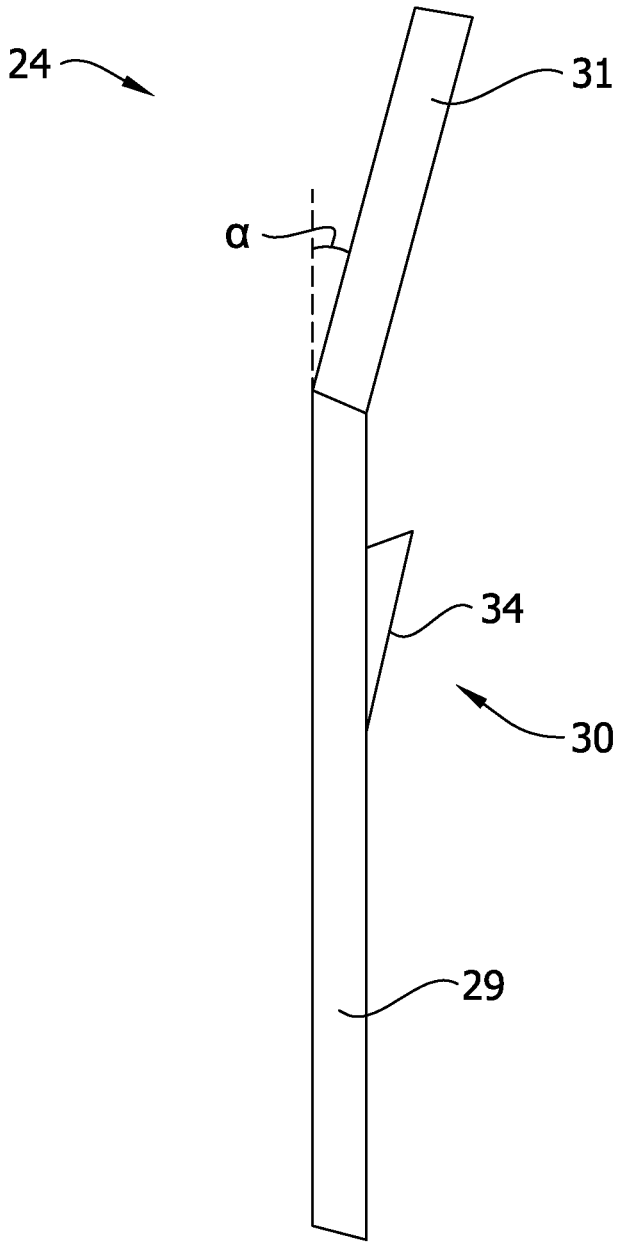
FIG. 5A is a side view of the weight plate.
Figure 5B:
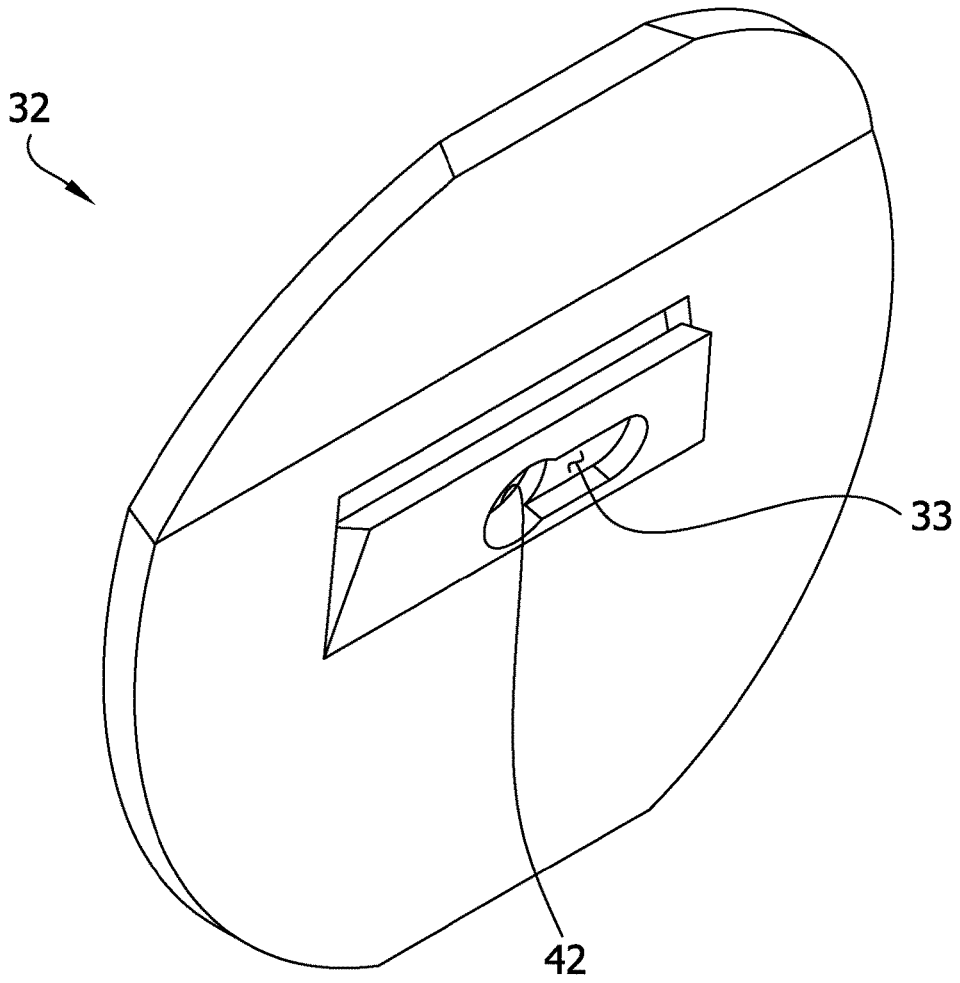
FIG. 5B is a perspective of a collar plate of the apparatus.

Referring to FIG. 5, each weight plate 24 comprises a main body portion 29 and a top bent portion 31 extending from the main body portion at a skewed angle. The weight plate 24 is made of a suitable material such as steel and may be overmolded with another, safer material such as plastic. In a preferred embodiment, the top bent portion 31 is skewed from the main body portion 29 by an angle $\alpha$ of about 12 degrees (FIG. 5A). This configuration of the weight plates 24 reduces the overall length of the apparatus 10 as compared to weight plates without a bend. As a result, the shape of the weight plates 24 creates a more compact apparatus 10 which makes it easier to manipulate. The weight plates 24 may have other shapes and configurations without departing from the scope of the present invention. For instance, the weight plates could be substantially round or substantially rectangular. Moreover, the plates could have a different bend or be flat.

Each collar 18, 20 may have a collar plate 32 fixed to the respective collar for engaging the first weight plate 24 of the weight set 16 (FIGS. 1-3 and 5B). The collar plates 32 can be made of a suitable material such as steel and have the same overall shape as the weight plates. However, it is to be understood that the collar plates may have a shape different from the shape of the weight plates. In the illustrated embodiment, a gear slot 33 is formed in the collar plate 32 to provide clearance for gears of the apparatus 10 as will be explained in greater detail below. Also, a collar plate (not shown) may be slightly smaller than the weight plates 24 shown in the drawings so as to accommodate weight plates of different shapes (e.g., circular weight plates, not shown) without projecting out from any peripheral edge of either shape of weight plate. The weight plates 24 are designed to lock together in sequence from the collar 18, 20 toward the outermost weight plate 24. Thus, the weight plates 24 can be designed to lock to the collar plates 32.

Figure 4:
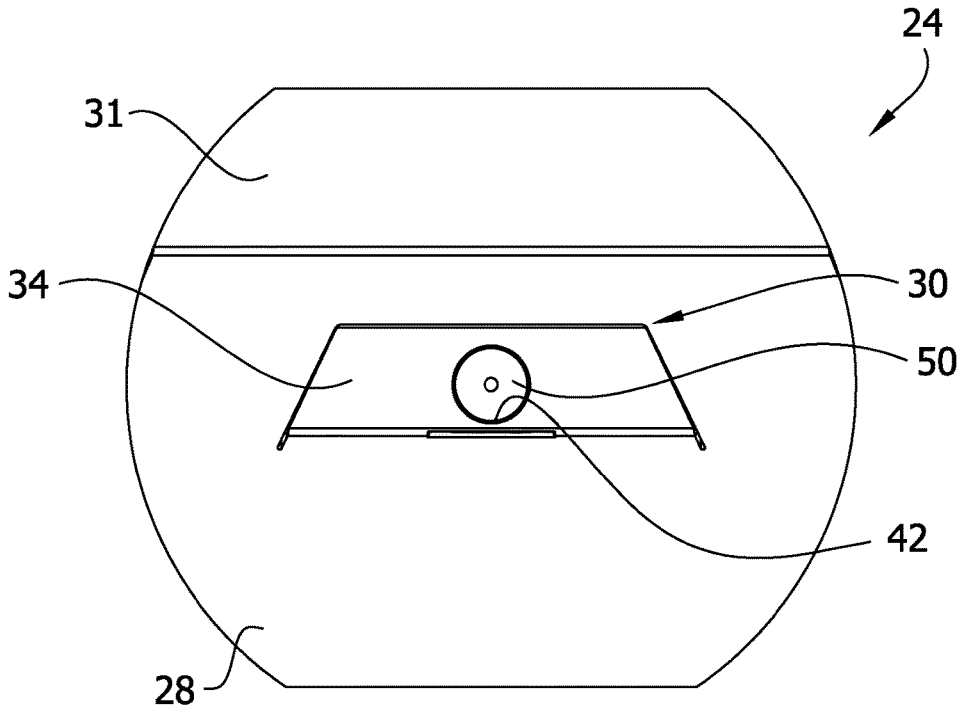
FIG. 4 is an end view of the apparatus.

Referring to FIGS. 4-5A, the weight plates 24 and collar plates 32 each have plate locking mechanisms 30 for attaching to adjacent plates. Specifically, the locking mechanisms 30 function to lock two adjoining weight plates 24 together, or a weight plate to either one of the collar plates 32. The locking mechanisms 30 include a central locking tang 34 formed by making a three-sided cut (two lateral side cuts and a transverse top cut) in each of the plates 24, 32. The area inside the cut is bent outward along a tang bend at an angle, forming the locking tang 34. The void left by the tang 34 forms a central locking slot 36. Additionally, the two lateral side cuts taper toward the top cut such that a bottom edge of the tang 34 is longer than a top edge of the tang. In the illustrated embodiment, the tang 34 has an isosceles trapezoidal shape. However, the tang 34 could have other shapes such as non-isosceles trapezoidal, rectangular or semi-circular without departing from the scope of the present invention. As such, any number of straight or curved cuts could be used to form the tang.

The central locking tangs 34 are designed to facilitate locking and unlocking of the weight plates 24 and collar plates 32 during use of the apparatus 10. The top edge of each tang 34 has a locking surface 38. The locking surface 38 is designed to engage and lock into an upper portion of a central locking slot 36 of an adjacent weight plate 24 or collar plate 32. This method of construction allows for the necessary positioning of the central locking tangs 34 with respect to adjoining central locking slots 36 while providing a mechanism that allows for the placement of a plurality of weight plates 24 flush up against one another.

The locking mechanism 30 may further comprise secondary tangs (not shown) on the plates. It will be understood that any suitable plate interlock may be used within the scope of the present invention. One example of secondary tangs is shown in my International Patent Application No. PCT/US2012/062289, the disclosure of which is incorporated herein by reference Referring to FIGS. 5 and 5B, each of the weight plates 24 and collar plates 32 also include selector shaft holes 42 positioned at a center of the plates for allowing the passage of selector shafts 50 (see, FIG. 6) in and out of the weight plates for engaging and selecting the desired amount of weight. Each collar 18, 20, although only collar 20 is illustrated, includes a shaft ring 44 that projects from an inner surface of the collar and surrounds the selector shaft hole 42 in the collar (FIGS. 7 and 7A). An insert 98 is received inside an interior space of the collar 18, 20. The insert helps locate various components of the apparatus 10 as will be explained in greater detail below. The skewed orientation of the collar plates 32 with respect to a longitudinal axis LA of the handle 14, in combination with the locking mechanisms 30, cause a portion of the weight plates 24 to be held at a skewed angle with respect to the longitudinal axis of the handle 14 when the weight plates 24 are retained on the handle assembly 12.

Selection of the desired weight is achieved through manipulation of the knobs 26 which in turn actuate components of the handle assembly 12. Referring to FIGS. 6 and 8-10A, the handle assembly comprises the handle 14, selector shafts 50, a gear assembly 52 and a locking assembly 54. The knobs 26 and gear assembly 52 are broadly an adjustment assembly. The gear assembly 52 comprises a first spur gear 56, a second spur gear 58 mating with the first spur gear, a connecting axle 60 extending from the second spur gear, and a third spur gear 62 mounted on a bottom end of the connecting axle for engaging teeth 64 (see, FIGS. 9-10) on the selector shafts 50. A cutout 63 (FIGS. 7 and 7A) in the shaft ring 44 and a cutout 65 in the insert 98 receive at least a portion of the third spur gear 62 allowing the third spur gear to engage the selector shaft 50 without interfering with the collar 18, 20. The gear slot 33 in the collar plate 32 also receives a portion of the third spur gear 62 providing clearance for the gear. A cutout 67 in the insert 98 in the collar 18, 20 receives portions of the first and second spur gears 56, 58 providing clearance for the first and second gears. Each knob 26 is mounted on an actuator shaft 66 (broadly, "a first locking element"), and the first spur gear 56 is press fit onto the actuator shaft such that rotation of a knob also rotates a respective first spur gear on the actuator shaft. A hole 68 (FIG. 7) in the shaft ring 44 receives the actuator shaft 66 so that a bottom end of the actuator shaft is positionable adjacent a side of the selector rod 50. The knobs 26 are rotatable about the axis of the actuator shaft 60 which is generally perpendicular to the longitudinal axis LA of the handle 14. However, other configurations are contemplated.

It is also contemplated that a structure other than a knob can be used. For instance, a dial (not shown) could be used to adjust the number of weight plates 24 in each set 16 supported by the handle assembly 12. Also, in the illustrated embodiment each weight set 16 has a dedicated knob 26 for selecting the weight plates 24 of the weight plate sets 16. However, a single knob or dial could be used to adjust both weight sets 16. It will be understood that the gear assembly 52 and locking assembly 54 would be modified to accommodate the single selector element configuration.

Figure 7:
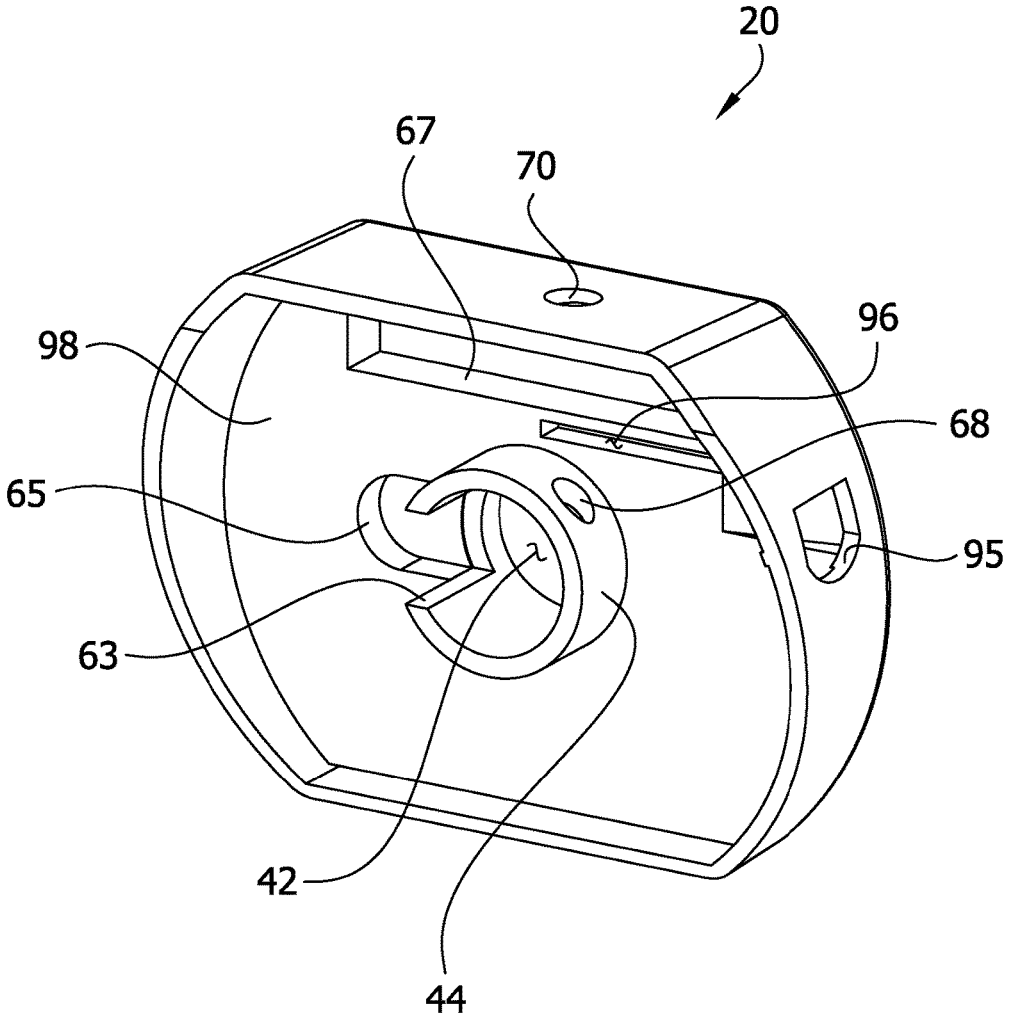
FIG. 7 is a perspective of a right side collar of the apparatus from a right side vantage.
Figure 7A:
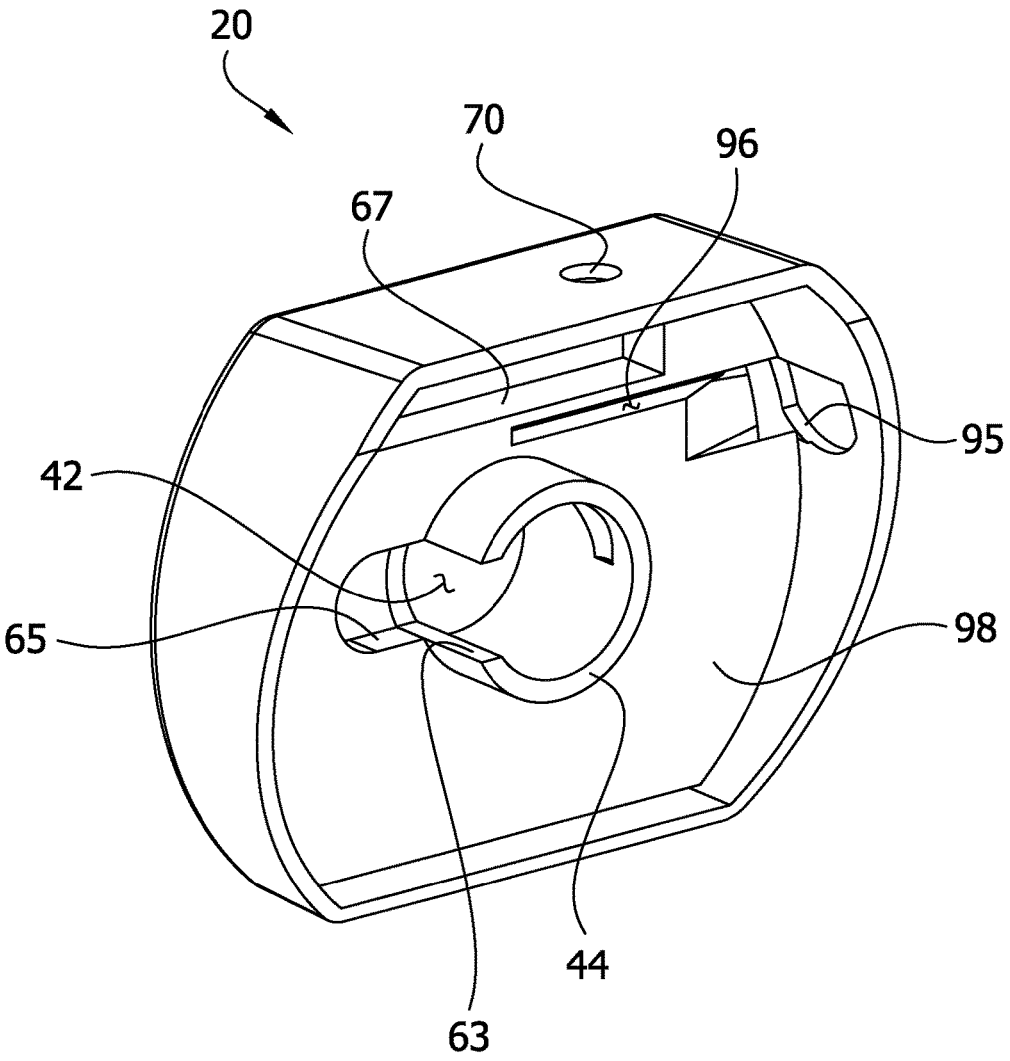
FIG. 7A is a perspective of a left side collar of the apparatus from a left side vantage.
Figure 8:
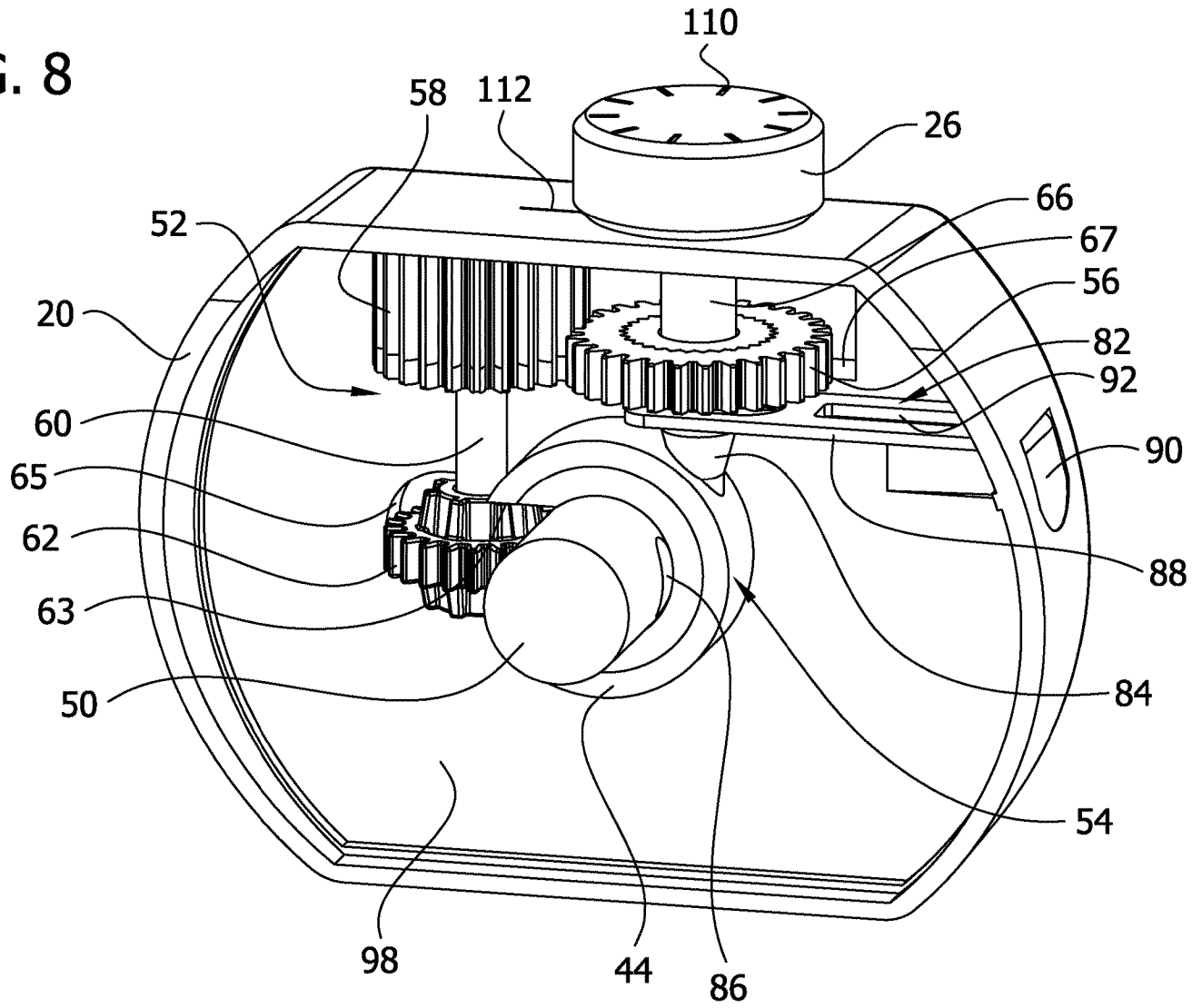
FIG. 8 is a perspective of the right side collar including an adjustment assembly and locking assembly of the apparatus with the locking assembly in a locked configuration.
Figure 9:
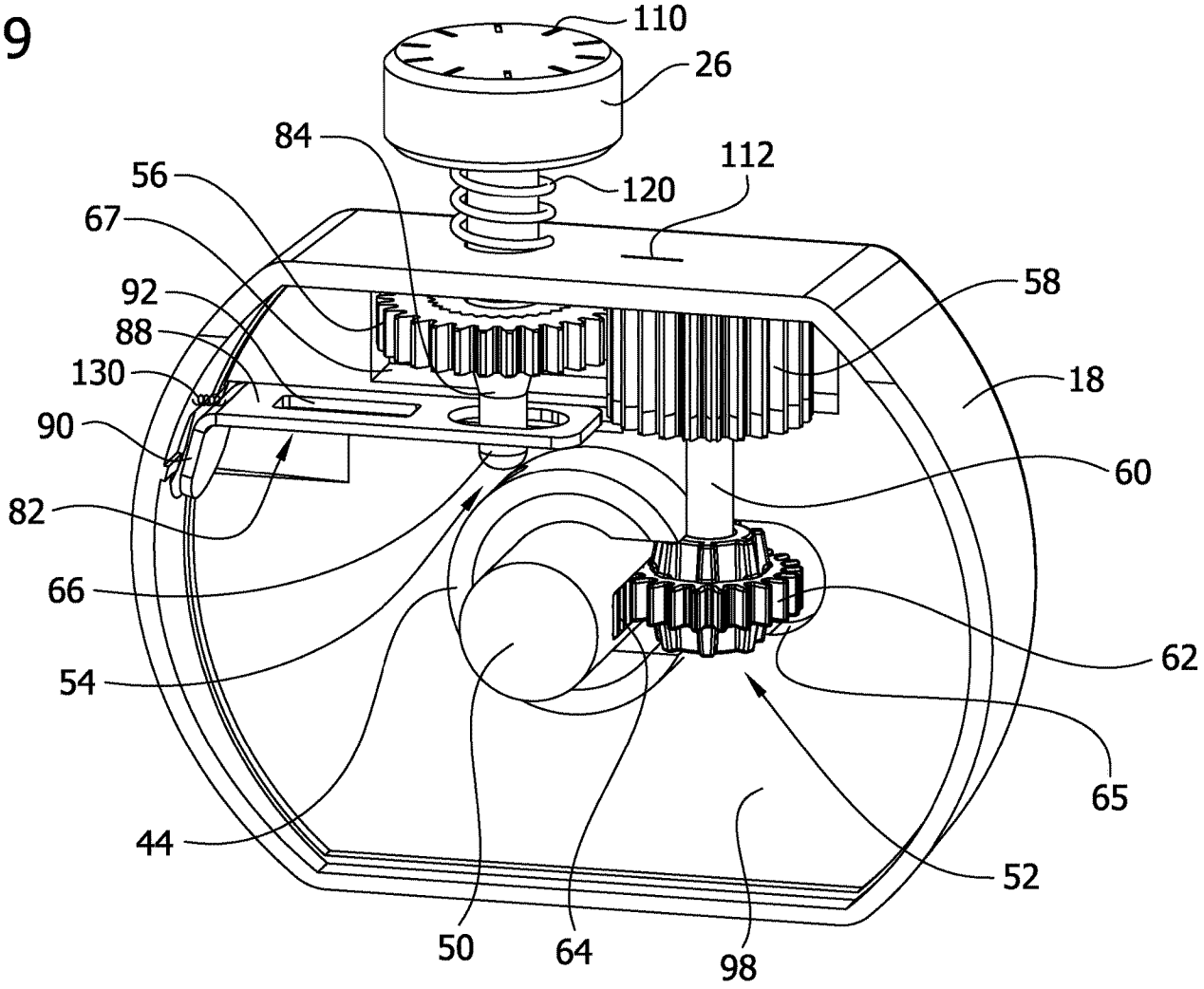
FIG. 9 is a perspective of the left side collar, but with the locking assembly in an unlocked configuration.
Figure 9A:
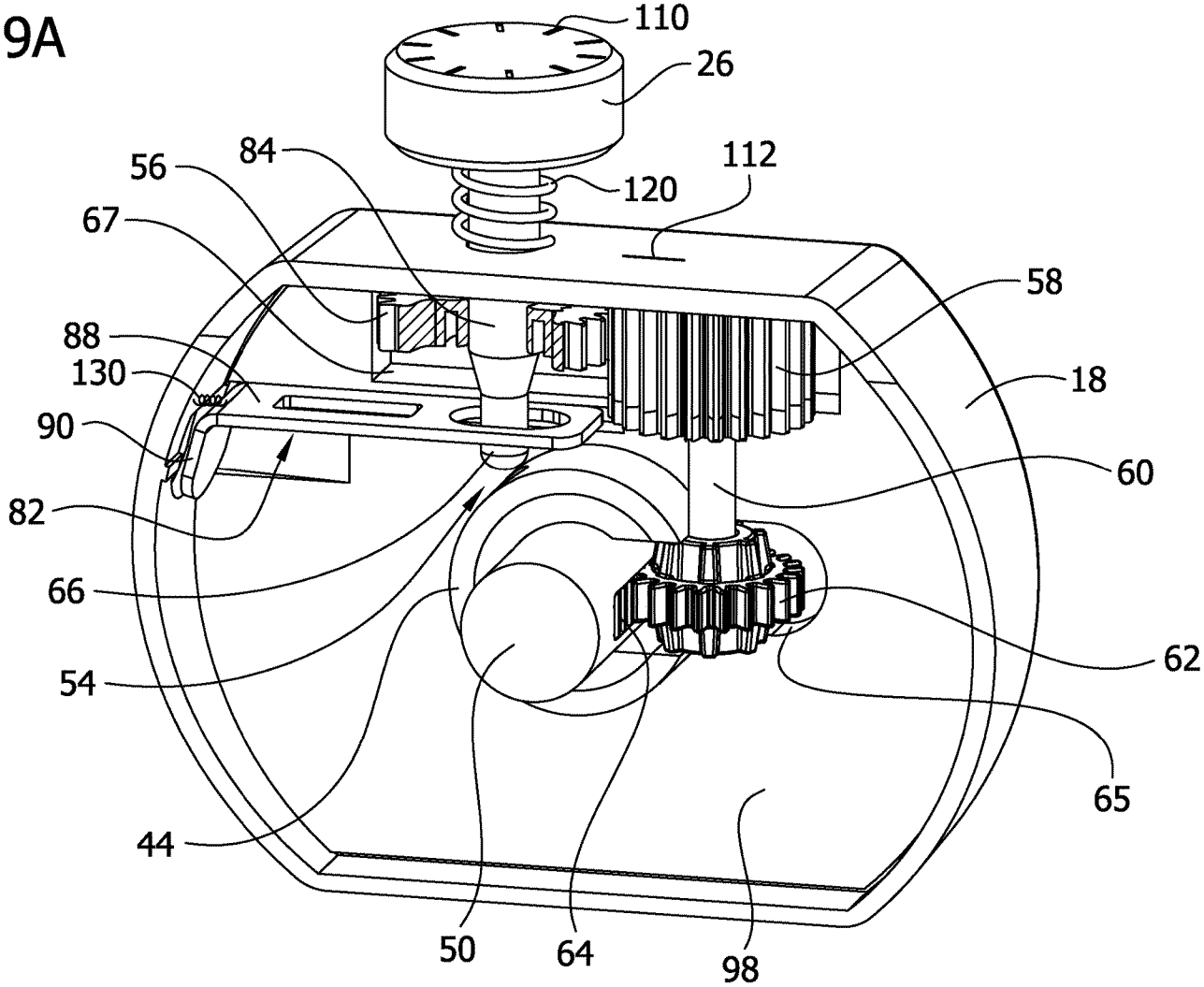
FIG. 9A is the perspective of FIG. 9 with portions of the adjustment assembly and locking assembly broken away to show detail.
Figure 10:
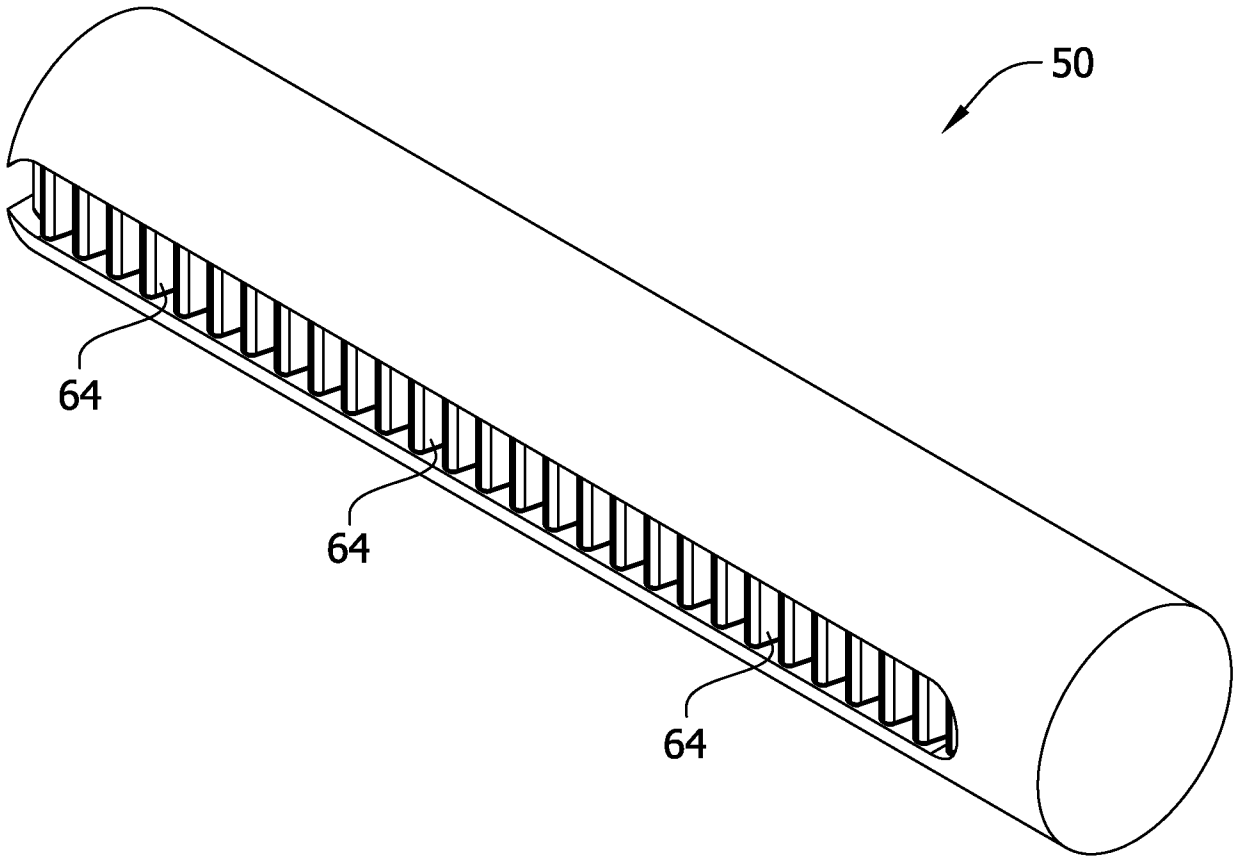
FIG. 10 is a front side perspective of a selector shaft of the apparatus.
Figure 10A:
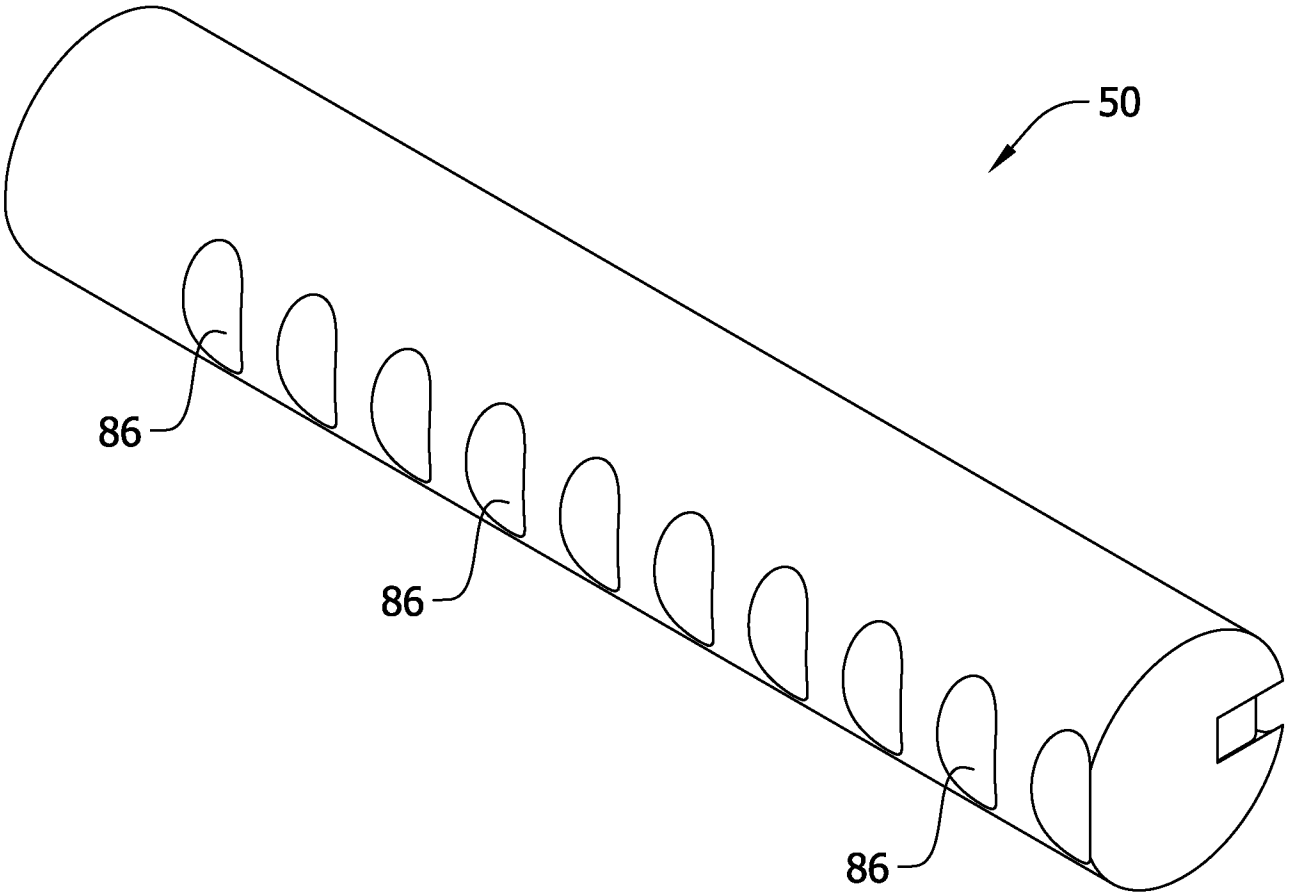
FIG. 10A is a rear side perspective of the selector shaft of the apparatus.
Figure 11:
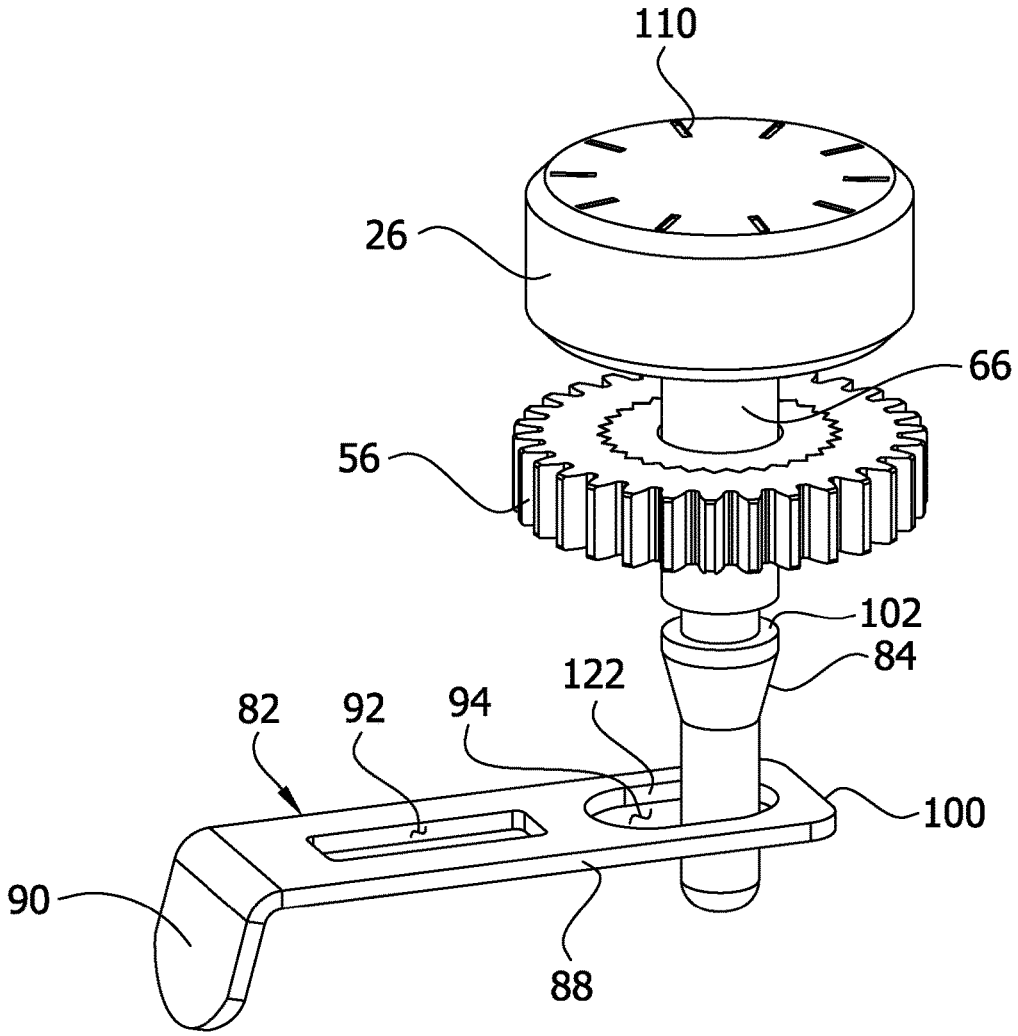
FIG. 11 is a perspective of a portion of the adjustment assembly and locking assembly of the apparatus.
Figure 12:
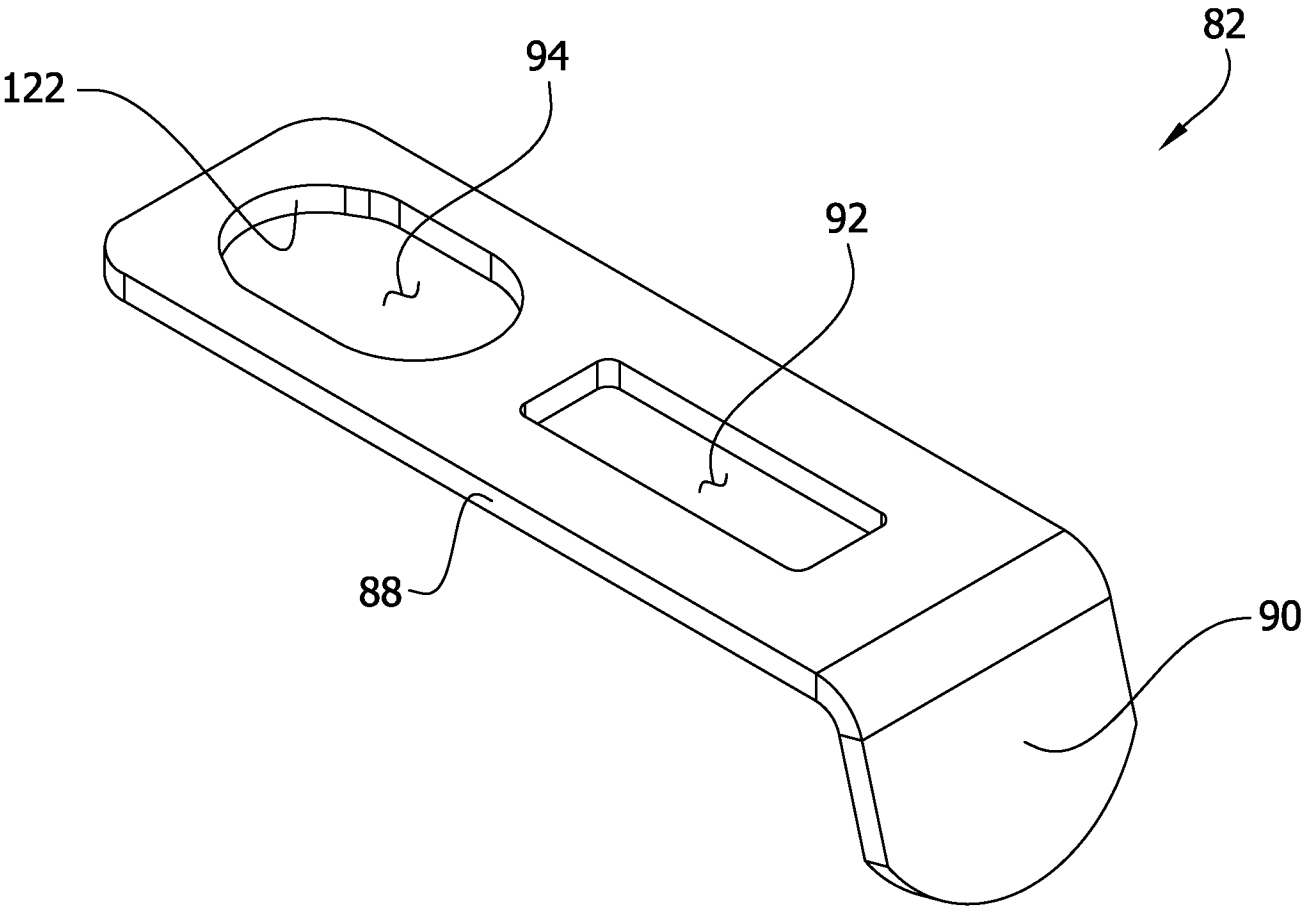
FIG. 12 is a perspective of a retaining member of the locking assembly.

Referring to FIGS. 8-9A, the first spur gear 56 engages the second spur gear 58 such that teeth on the first spur gear mesh with teeth on the second spur gear. Thus, rotation of a knob 26 rotates the first spur gear 56 in a first direction which in turn rotates the second spur gear 58 in a second direction, opposite the first direction. Because connecting axle 60 connects the second spur gear 58 to the third spur gear 62, rotation of the second spur gear also causes rotation of the third spur gear in the second direction. As best seen in FIGS. 9 and 9A, because teeth of the third spur gear 62 mesh with the teeth 64 on the selector shaft 50, rotation of the third spur gear causes the selector shaft to translate longitudinally in the handle 14. The collars 18, 20 enclose portions of respective gear assemblies 52. Each collar 18, 20 has an opening 70 (FIGS. 7 and 7A) that passes the actuating rod 66 so that the knobs 26 are accessible to a user to allow the user to rotate the knobs during use. As will be explained in greater detail below, the knobs 26 are vertically movable to lock and unlock the selector shafts 50 in place within the handle 14. The vertical movement of the knob allows the locking assembly 54 to be easily locked and unlocked by a user.

Figure 6:
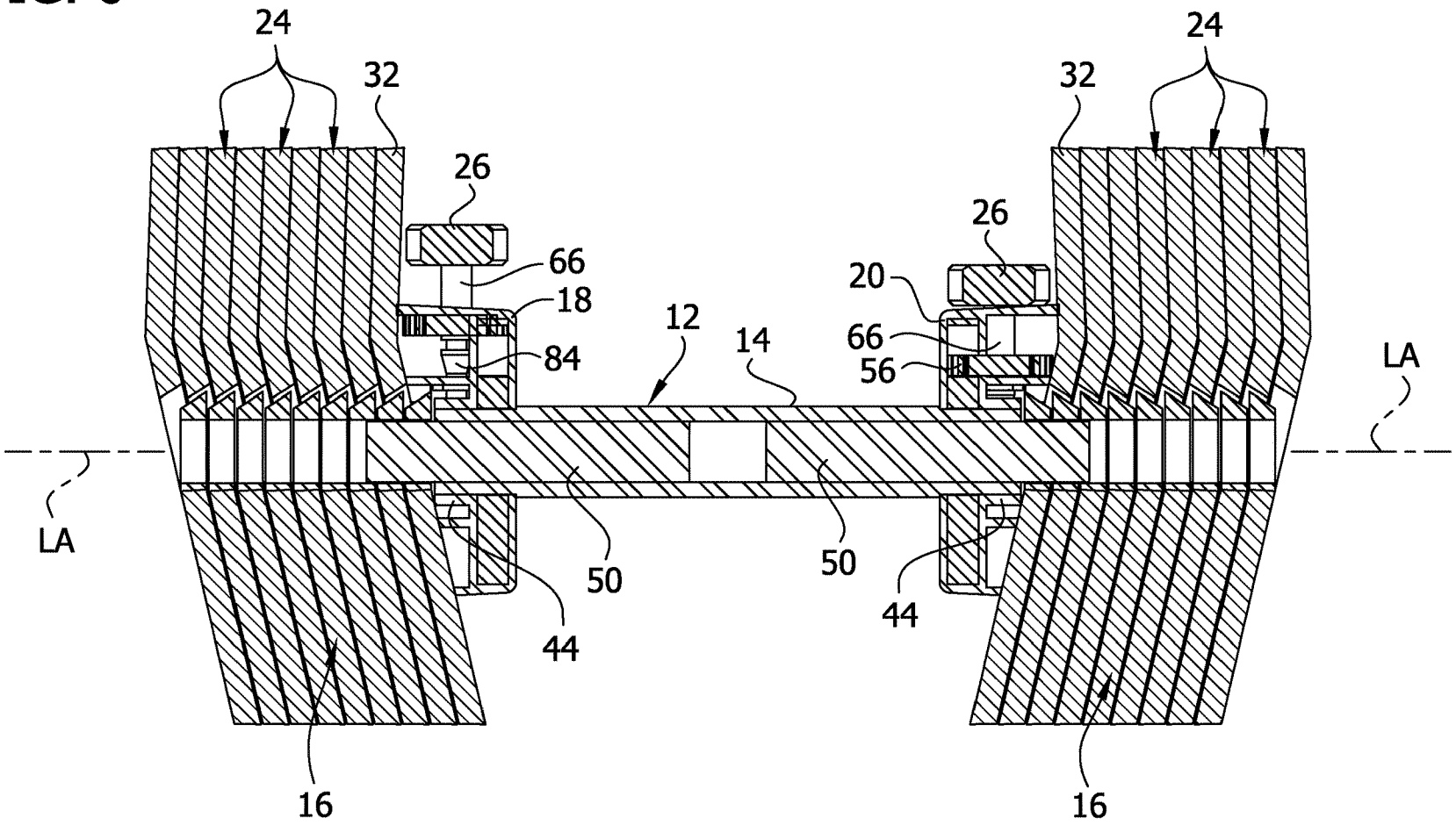
FIG. 6 is a cross section of the apparatus taken through line 6-6 in FIG. 3.

The selector shafts 50 (broadly, "selectors") are at least partially received in the handle 14 and selector shaft holes 42 by a close tolerance such that movement of the selector shafts and weight plates 24 transverse to the longitudinal axis of the handle is restricted (FIG. 6).

Referring to FIGS. 8-12, each locking assembly 54 comprises a retaining member 82 slidably mounted in a respective collar 18, 20, a conical member 84 on the actuator shaft 66, and a series of longitudinally spaced recesses 86 (broadly, "second locking elements") in the selector shaft 50. The retaining member 82 comprises a locking portion 88 and a tab portion 90 extending from the locking portion. The locking portion 88 has an elongate plate opening 92 and an elongate rod opening 94. The rod opening receives the actuator shaft 66 so that at least a portion of the bottom end of the actuator shaft may be received in a recess 86 in the selector shaft 50. The tab portion 90 of the retaining member 82 extends at least partially though a hole 95 in a side wall of the collar 18, 20 and the locking portion 88 is at least partially captured in channel 96 (FIGS. 7 and 7A) in insert in the collar 18, 20 to constrain movement of the retaining member to substantially sliding translational movement with respect to the collar.

Figure 8A:
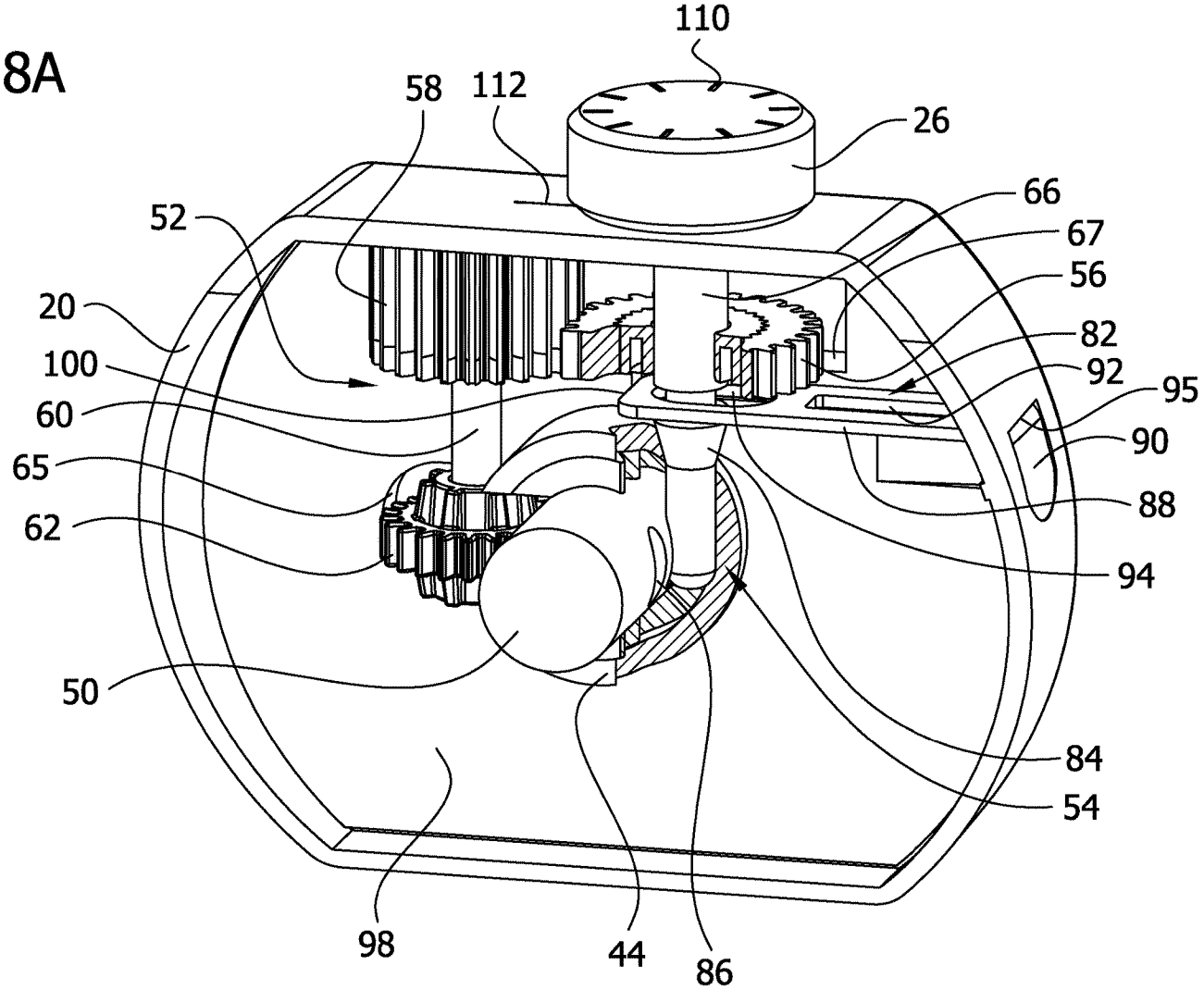
FIG. 8A is the perspective in FIG. 8 with portions of the adjustment assembly and locking assembly broken away to show detail.

Referring to FIGS. 8 and 8A, when the locking assembly 54 is in a locked configuration, the knob 26 is in a depressed position wherein a free end 100 of the locking portion 88 of the retaining member 82 is disposed between a shoulder 102 of the conical member 84 and a bottom surface of the first spur gear 56. The free end 100 of the retaining member 82 around the opening 94 engages the shoulder 102 of the conical member 84 and holds the dial 26 in the depressed position so that the bottom end of the actuator shaft 66 is secured in a recess 86 in the selector shaft 50. Thus, the selector shaft 50 is held from longitudinal movement by the engagement between the bottom end of the actuator shaft 66 and the recess 86. In particular, the outer longitudinally extending surface of the actuator shaft 66 engages the surface of the recess 86 and the opposing nature of the two surfaces restricts longitudinal movement of the selector shaft 50. The selector shaft 50 is also held from transverse movement by the positioning of the bottom of the actuator shaft 66 and the third spur gear 62 being in opposed relation on opposite sides of the selector shaft. Specifically, the bottom end of the actuator shaft 66 and the third spur gear 62 are disposed on opposing lateral sides of the selector shaft 50 to restrict transverse movement of the selector shaft. Therefore, in the locked configuration, the selector shaft is fixed against both longitudinal and transverse movement. So the movement of the weight plates 24 is restricted, helping to eliminate looseness or "slop" and the points of weakness that can exist in prior art designs having side gaps. When the locking assembly 54 is in an unlocked configuration (FIGS. 9 and 9A), the knob 26 is in a raised position freeing the bottom end of the actuator shaft 66 from the recess 86 in the selector shaft 50 permitting the selector shaft to be adjusted by the knob.

Figure 8B:
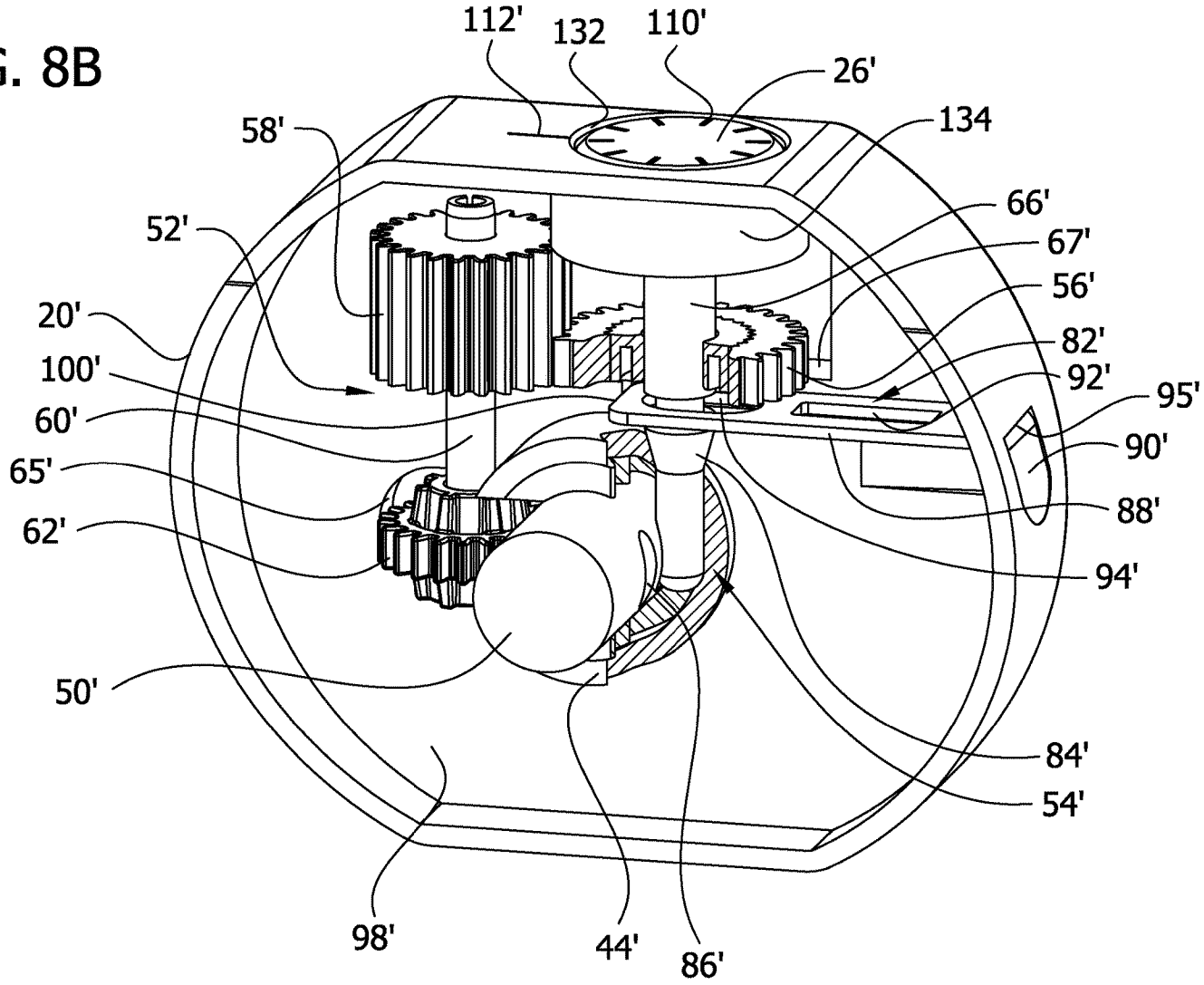
FIG. 8B is a perspective like FIG. 8, but showing a different embodiment in which a knob of the adjustment assembly is recessed into the collar in a locked configuration.

Referring to FIG. 8B, another embodiment of the present invention is shown. In this embodiment, the same parts will be designated with the same reference numeral as in the prior embodiment, but with the addition of a prime after the numeral. Accordingly, not all parts will be described again for this embodiment. The collar 20' now includes an opening 132 that is large enough to receive the knob 26' into the interior of the collar so that the knob is generally flush with a top surface of the collar. A collar 20' now includes a cup 134 that has a bottom wall (not shown) with an opening for receiving the actuator shaft 66' through the cup. The bottom wall provides a reaction surface for the spring (not shown, but like spring 120 that may be seen in FIG. 9A). When the actuator shaft 66' is released by the retaining member 82', the knob 26' pops up through the opening 132 under the influence of the spring, where the knob can be easily grasped for changing the weight selection. It will be understood that the opposite collar (not shown) may have the same construction including a recessed knob.

Weight indicia 110 can be provided on each knob 26. The indicia 110 may comprise notches spaced around a top surface of the knob 26. An indicator mark 112 on the collar 18, 20 can indicate that a weight plate 24, 32 is engaged when a notch on the knob 26 is aligned with the indicator mark. The notches may be spaced approximately 36 degrees from each other to define about 10 different weight increments of the apparatus 10. Thus, each notch may correspond to a plate 24, 32 so that a single rotation of the knob 26 will retain every plate of the apparatus 10. As will be explained in greater detail below, the gear assembly 52 allows for this feature of the apparatus 10. The recesses 86 on each selector shaft 50 are preferably positioned so that each recess corresponds to a plate 24, 32 of the apparatus 10. Thus, rotation of the knob 26 to a selected weight plate 24, 32 may align the actuator shaft 66 with a corresponding recess 86.

It may be seen that all or at least all major components of the apparatus 10 can be made of steel. However, use of other materials does not depart from the scope of the present invention.

During use, a user may place the apparatus 10 in the unlocked configuration from a locked configuration by pressing the tab portion 90 of the retaining member 82 causing the retaining member to slide further into the collar 18, 20. The sliding movement of the retaining member 82 disengages the free end 100 of the locking member from between the shoulder 102 of the conical member 84 and the bottom surface of the first spur gear 56 allowing the knob 26 to be lifted into the raised position. It will be understood, that the knob 26 can be biased, such as by a spring 120 mounted on the collar 18, 20, to the raised position so that the knob automatically lifts to the raised position when the tab portion 90 of the retaining member 82 is pressed. In the raised position, the user may select the desired amount of weight by rotating the knob 26 either clockwise or counterclockwise. In the illustrated embodiment, the spring 120 is mounted on top of the collar 18, 20. However, the spring 120 could be mounted in an interior of the collar so as not to be visible to the user.

Figure 2:
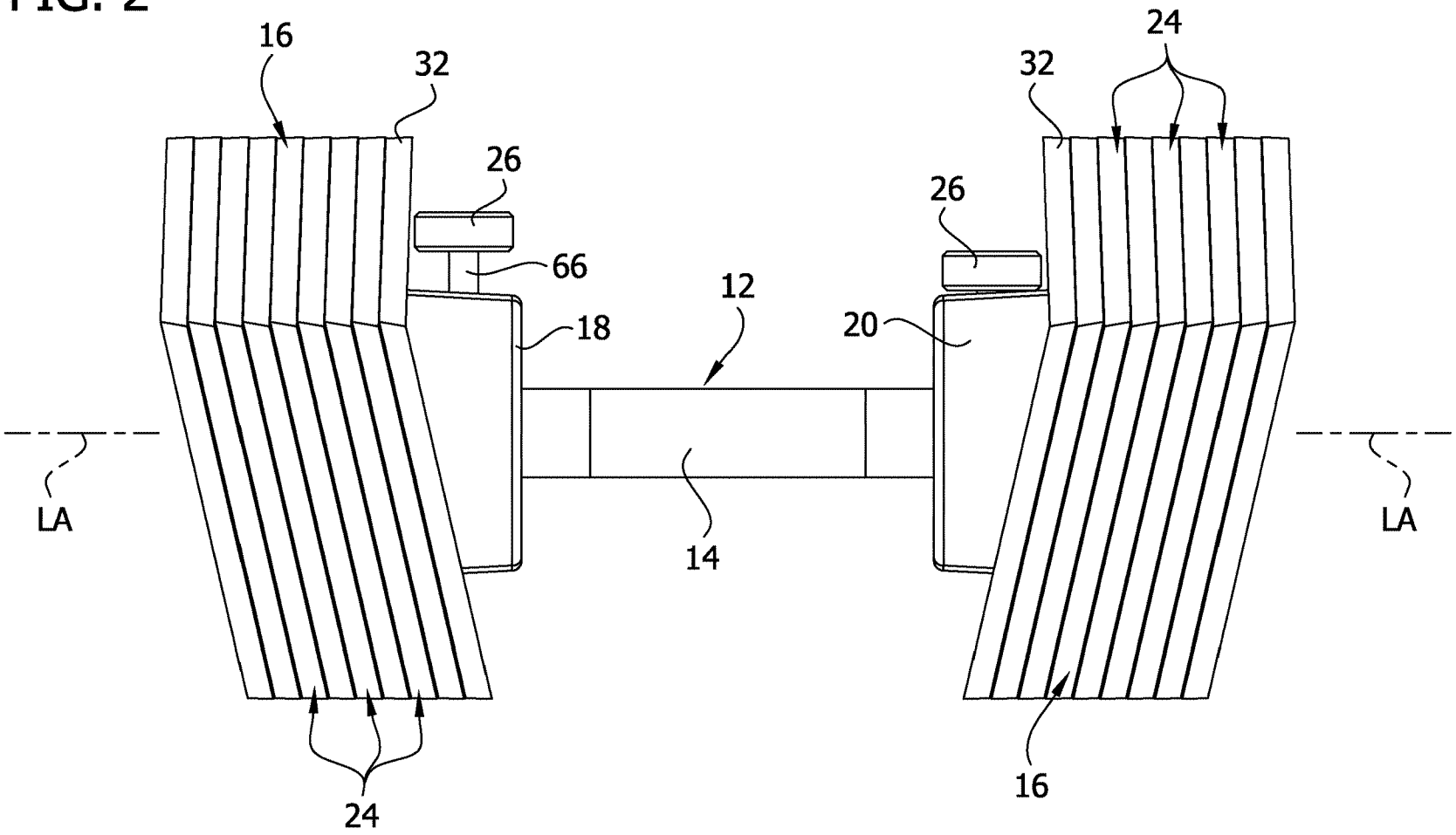
FIG. 2 is a side view of the apparatus.
Figure 3:
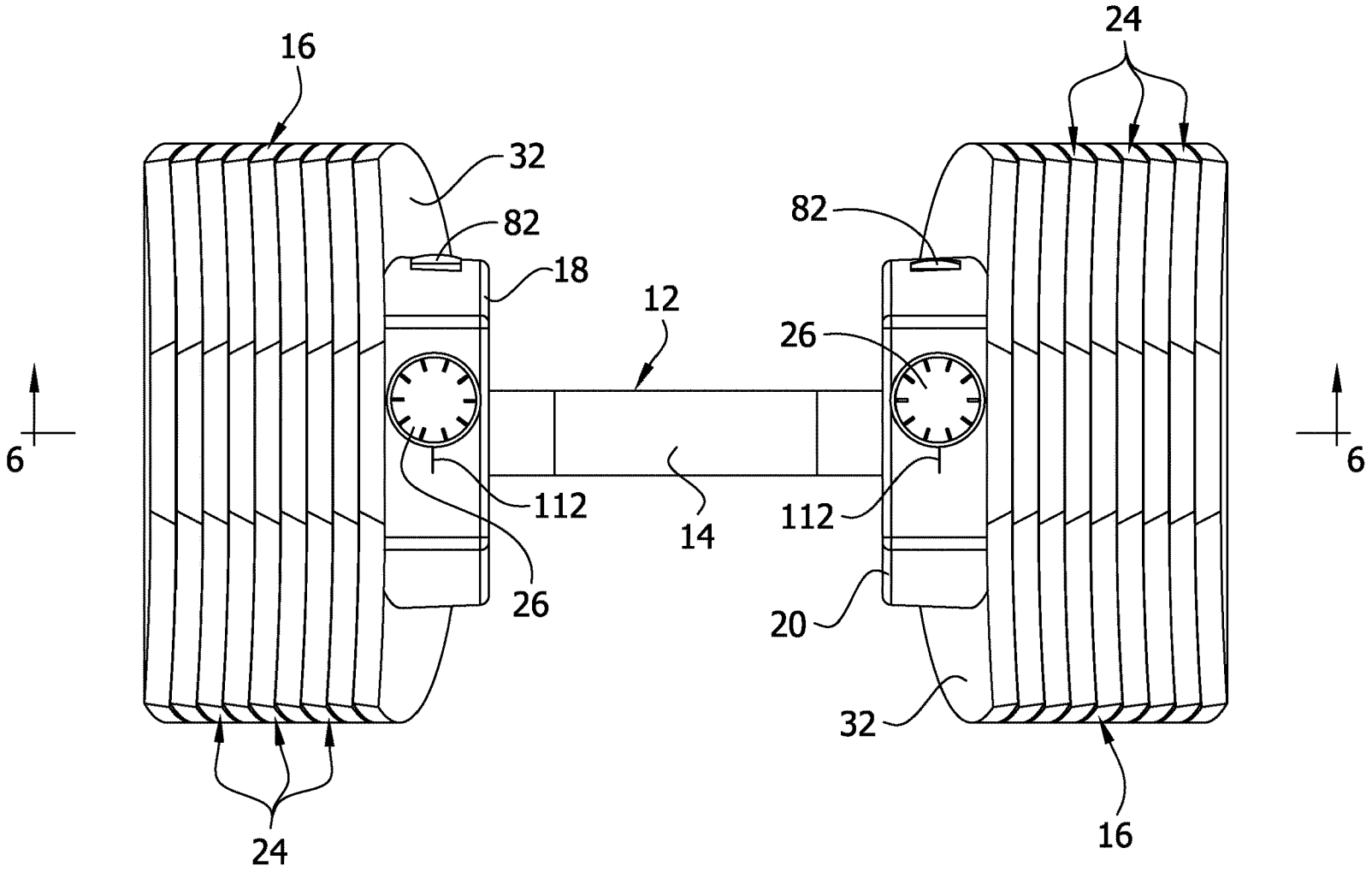
FIG. 3 is a top view of the apparatus.

In the illustrated embodiment, rotation of the right knob, as viewed in FIGS. 2 and 6, in a clockwise direction and rotation of the left knob in a counterclockwise direction causes the teeth of the third spur gear 62 to ride along the teeth 64 of the selector shaft 50 moving the selector shafts outward away from a center of the handle 14. As the selector shafts 50 are moved outward they will extend further into the weight sets 16 through the selector shaft holes 42 in the weight plates 24, engaging more weight plates. Therefore, if the user lifts the handle 14 upward the locking mechanisms 30 will cause more weight plates 24 to be retained on the handle assembly 12. The apparatus 10, and particularly the gear assembly 52, is configured such that one complete rotation of each knob 26 will retain every plate 24, 32 on the handle assembly 12. *A single weight plate indicia corresponds to a weight plate such that one full rotation of the selector element retains every weight plate in said at least one of the first and second weight sets.* The transfer of rotational movement by the gears 56, 58, 62 of gear assembly 52 to translational movement of the selector shaft 50 is such that rotation of the knob 26 and thus the first spur gear 56 an incremental degree (e.g., 36 degrees) causes translational movement of a distance sufficient to advance the selector shaft a single weight plate.

Conversely, if the right knob 26 is rotated in the counterclockwise direction and the left knob is rotated in the clockwise direction, the teeth of the third spur gear 62 will ride along the teeth 64 of the selector shaft 50 moving the selector shafts inward toward the center of the handle 14. This will reduce the number of weight plates 24 engaged by the selector shafts 50, resulting in an apparatus of lesser weight. The apparatus 10 is configured such that the selector shafts 50 will not extend past the outermost plate when at least one weight plate 24 or collar plate 32 on each side of the handle 14 is retained by the handle assembly 12.

To lock the weight plates 24, 32 in position, the user may depress the knob 26 causing the actuator shaft 66 to move downward and the outer surface of the conical member 84 to engage a rim 122 of the actuator opening 94. The rim 122 of the actuator opening 94 will ride along the outer surface of the conical member 84 until the rim clears the shoulder 102 causing the free end 100 of the retaining member 82 to again be disposed between the shoulder 102 and the bottom surface of the first spur gear 56. In this position, the selector shaft 50 will again be locked in place. It will be understood that the retaining member 82 may be biased outward, such as by a spring (130) in the collar 18, 22, so that the locking member automatically moves into the locked configuration when the knob 26 is fully depressed (FIGS. 9 and 9A). It is also understood that the retaining member 82 itself may be a flex spring that biases the retaining member outward. In the event that the apparatus 10 is dropped during use, the locking mechanism 30 and the locking assembly 54 secure the plates 24, 32 together keeping the plates in place on the apparatus.

Having described the invention in detail, it will be apparent that modifications and variations are possible without departing from the scope of the invention defined in the appended claims.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A selectable weight set apparatus comprising:

a handle assembly comprising a handle having a first end portion and a second end portion opposite the first end portion;

a first weight set adapted to be supported on the first end portion of the handle and a second weight set adapted to be supported on the second end portion of the handle, each of the first and second weight sets comprising a plurality of weight plates;

an adjustment assembly for selecting a number of weight plates to be retained to the handle assembly, the adjustment assembly comprising at least one selector for movement relative to at least one of the first and second weight sets to engage and select the weight plates in said at least one of the first and second weight sets; and a locking assembly for fixing the at least one selector relative to said at least one of the first and second weight sets, the locking assembly comprising a first locking element and a plurality of second locking elements, the first locking element being configured for releasable engagement with the at least one selector and one of the plurality of second locking elements on the at least one selector after the at least one selector is moved to engage and select the weight plates in said at least one of the first and second weight sets;

wherein the adjustment assembly further comprises a selector element fixed to the first locking element and operatively connected to the at least one selector for moving the at least one selector to retain a selected number of weight plates, movement of the selector element to advance the at least one selector to a selected weight plate aligning the first locking element with a second locking element associated with the selected weight plate; and wherein the adjustment assembly further comprises at least one gear assembly for moving the at least one selector to engage and select the weight plates in said at least one of the first and second weight sets, the gear assembly engaging the at least one selector at a first location and the first locking element engaging the at least one selector at a second location different from the first location.

2. The selectable weight set apparatus as set forth in claim 1 wherein the first and second locations are on opposite lateral sides of the at least one selector to restrict transverse movement of the at least one selector.

3. The selectable weight set apparatus as set forth in claim 2 wherein the first locking element comprises a rod member and the second locking element comprising a plurality of recesses formed in the at least one selector, a longitudinal engagement surface of the rod member being receivable in one of the recesses to restrict longitudinal movement of the at least one selector.

4. The selectable weight set apparatus as set forth in claim 3 wherein the recesses are spaced longitudinally along a length of the at least one selector.

5. The selectable weight set apparatus as set forth in claim 4 wherein the at least one selector is a selector shaft moveable through selector holes in the weight plates.

6. The adjustable weight set apparatus as set forth in claim 1 wherein substantially vertical movement of the first locking element engages and disengages the first locking element with second locking elements on the at least one selector.

7. The selectable weight set apparatus as set forth in claim 1 wherein the locking assembly further comprises a retaining member slidably mounted on the handle assembly for selectively placing the locking assembly in locked and unlocked configurations.

8. The selectable weight set apparatus as set forth in claim 7 wherein the first locking element includes a shoulder and the retaining member is adapted to engage the shoulder of the first locking element to retain the locking assembly in the locked configuration.

9. The selectable weight set apparatus as set forth in claim 8 wherein the first locking element comprises a tubular portion and a conical portion around the tubular portion, the conical portion defining the shoulder of the first locking element.

10. The selectable weight set apparatus as set forth in claim 9 wherein the retaining member comprises a locking portion having an opening receiving the first locking element therethrough, the shoulder of the first locking element opposing a bottom surface of the locking portion when the locking assembly is in the locked configuration.

11. The selectable weight set apparatus as set forth in claim 8 wherein the retaining member is slidable to disengage the retaining member from the shoulder of the first locking element for placing the locking assembly in the unlocked configuration.

12. The selectable weight set apparatus as set forth in claim 8 wherein the first locking element is biased toward a position corresponding to the unlocked configuration of the locking assembly.

13. The selectable weight set apparatus as set forth in claim 12 wherein the retaining member is biased toward a position corresponding to the locked configuration of the locking assembly.

14. The selectable weight set apparatus as set forth in claim 1 further comprising a rotatable selector element including weight plate indicia, wherein selector element is operatively connected to the at least one selector by the at least one gear assembly for moving the at least one selector to engage and select the weight plates in said at least one of the first and second weight sets, a single weight plate indicia corresponds to a weight plate such that one full rotation of the selector element retains every weight plate in said at least one of the first and second weight sets.

15. A handle assembly for a selectable weight set apparatus comprising:

a handle for supporting a plurality of weight plates;

an adjustment assembly associated with the handle for selecting a number of weight plates to be retained to the handle, the adjustment assembly comprising at least one selector for movement relative to the handle to engage and select the weight plates to be retained to the handle, the selector having a length; and a locking assembly for fixing the at least one selector relative to the handle, the locking assembly comprising a first locking element and a plurality of recesses on the at least one selector, the first locking element being configured for releasable engagement with the at least one selector and one of the plurality of recesses on the at least one selector to place the locking assembly in locked and unlocked configurations, each recess of the plurality of recesses defining a longitudinal axis extending transverse to the length of the selector, the first locking element being movable along the longitudinal axes of the plurality of recesses to place the locking assembly in the locked and unlocked configurations;

wherein the adjustment assembly further comprises a selector element fixed to the first locking element and operatively connected to the at least one selector for moving the at least one selector to retain a selected number of weight plates.

16. A handle assembly for a selectable weight set apparatus comprising:

a handle for supporting a plurality of weight plates;

an adjustment assembly associated with the handle for selecting a number of weight plates to be retained to the handle, the adjustment assembly comprising at least one selector shaft for movement lengthwise of the at least one selector shaft relative to the handle to engage and select the weight plates to be retained to the handle; and a locking assembly for fixing the at least one selector shaft relative to the handle, the locking assembly comprising an actuator shaft and a plurality of locking structures on the at least one selector shaft, the actuator shaft being linearly movable relative to the at least one selector shaft to engage and disengage the locking structures on the at least one selector shaft to place the locking assembly in locked and unlocked configurations;

wherein the actuator shaft is operatively connected to the at least one selector shaft to drive movement of the at least one selector shaft to retain a selected number of weight plates.

*17. A selectable weight set apparatus comprising:*

*a handle assembly comprising a handle having a first end portion and a second end portion opposite the first end portion;*

*a first weight set adapted to be supported on the first end portion of the handle and a second weight set adapted to be supported on the second end portion of the handle, each of the first and second weight sets comprising a plurality of weight plates;*

*an adjustment assembly for selecting a number of weight plates to be retained to the handle assembly, the adjustment assembly comprising at least one selector for movement relative to at least one of the first and second weight sets to engage and select the weight plates in said at least one of the first and second weight sets;*

*a locking assembly for fixing the at least one selector relative to said at least one of the first and second weight sets, the locking assembly comprising a first locking element and a plurality of second locking elements, the first locking element being configured for releasable engagement with the at least one selector and one of the plurality of second locking elements on the at least one selector after the at least one selector is moved to engage and select the weight plates in said at least one of the first and second weight sets;*

*wherein the adjustment assembly further comprises a selector element operatively connected to the at least one selector for moving the at least one selector to retain a selected number of weight plates, wherein*

*movement of the selector element from a first selector element position to a second selector element position causes movement of the selector from a first selector position to a second selector position, wherein movement of the selector element to advance the at least one selector to a selected weight plate aligns the first locking element with a second locking element associated with the selected weight plate, wherein the adjustment assembly and the locking assembly are adapted and configured to prevent, when the first locking element is engaged with any of the plurality of second locking elements, movement of the selector element from the first selector element position to the second selector element position and movement of the selector from the first selector position to the second selector position, wherein the adjustment assembly and the locking assembly are adapted and configured to allow, when the first locking element is disengaged with the plurality of second locking elements, movement of the selector element from the first selector element position to the second selector element position and movement of the selector from the first selector position to the second selector position; and*

*wherein the adjustment assembly further comprises at least one gear assembly for moving the at least one selector to engage and select the weight plates in said at least one of the first and second weight sets, the gear assembly engaging the at least one selector at a first location and the first locking element engaging the at least one selector at a second location different from the first location.*

*18. The selectable weight set apparatus as set forth in claim 17 wherein the first and second locations are on opposite lateral sides of the at least one selector to restrict transverse movement of the at least one selector.*

*19. The selectable weight set apparatus as set forth in claim 17 wherein the first locking element comprises a rod member and the second locking element comprising a plurality of recesses formed in the at least one selector, a longitudinal engagement surface of the rod member being receivable in one of the recesses to restrict longitudinal movement of the at least one selector.*

*20. The selectable weight set apparatus as set forth in claim 19 wherein the recesses are spaced longitudinally along a length of the at least one selector.*

*21. The selectable weight set apparatus as set forth in claim 20 wherein the at least one selector is a selector shaft moveable through selector holes in the weight plates.*

*22. The selectable weight set apparatus as set forth in claim 21 wherein the selector element is operatively connected to the at least one gear assembly in a manner such that movement of the selector element from the first selector element position to the second selector element position causes turning of the gear assembly and movement of the selector shaft from the first selector position to the second selector position, and such that turning of the selector element from the second element position to the first selector element position causes turning of the gear assembly and movement of the selector shaft from the second selector position to the first selector position.*

*23. The selectable weight set apparatus as set forth in claim 21 wherein the selector shaft includes a plurality of gear teeth at the first location, and wherein the at least one gear assembly comprises a selector element gear and a gear train, the selector element gear being operatively connected to the selector element in a manner such that the selector element gear moves with the selector element, the gear train comprising a plurality of gears, a first one of the plurality of gears having gear teeth meshing with the gear teeth of the selector element gear and a second one of the plurality of gears having gear teeth meshing with the gear teeth of the selector shaft, the gear train being adapted and configured such that movement of the selector element from the first selector element position to the second selector element position moves the selector shaft from the first selector position to the second selector position.*

*24. The selectable weight set apparatus as set forth in claim 17 wherein substantially vertical movement of the first locking element engages and disengages the first locking element with second locking elements on the at least one selector.*

*25. The selectable weight set apparatus as set forth in claim 17 wherein the locking assembly further comprises a retaining member slidably mounted on the handle assembly for selectively placing the locking assembly in locked and unlocked configurations.*

*26. The selectable weight set apparatus as set forth in claim 25 wherein the first locking element includes a shoulder and the retaining member is adapted to engage the shoulder of the first locking element to retain the locking assembly in the locked configuration.*

*27. The selectable weight set apparatus as set forth in claim 26 wherein the first locking element comprises a tubular portion and a conical portion around the tubular portion, the conical portion defining the shoulder of the first locking element.*

*28. The selectable weight set apparatus as set forth in claim 27 wherein the retaining member comprises a locking portion having an opening receiving the first locking element therethrough, the shoulder of the first locking element opposing a bottom surface of the locking portion when the locking assembly is in the locked configuration.*

*29. The selectable weight set apparatus as set forth in claim 26 wherein the retaining member is slidable to disengage the retaining member from the shoulder of the first locking element for placing the locking assembly in the unlocked configuration.*

*30. The selectable weight set apparatus as set forth in claim 17 further comprising a rotatable selector element including weight plate indicia, wherein selector element is operatively connected to the at least one selector by the at least one gear assembly for moving the at least one selector to engage and select the weight plates in said at least one of the first and second weight sets, a single weight plate indicia corresponds to a weight plate such that one full rotation of the selector element retains every weight plate in said at least one of the first and second weight sets.*

*31. A handle assembly for a selectable weight set apparatus comprising:*

*a handle for supporting a plurality of weight plates;*

*an adjustment assembly associated with the handle for selecting a number of weight plates to be retained to the handle, the adjustment assembly comprising at least one selector for movement relative to the handle to engage and select the weight plates to be retained to the handle, the selector having a length;*

*and a locking assembly for fixing the at least one selector relative to the handle, the locking assembly comprising a first locking element and a plurality of recesses on the at least one selector, the first locking element being configured for releasable engagement with the at least one selector and one of the plurality of recesses on the at least one selector to place the locking assembly in locked and unlocked configurations, each recess of the*

*plurality of recesses defining a longitudinal axis extending transverse to the length of the selector, the first locking element being movable along the longitudinal axes of the plurality of recesses to place the locking assembly in the locked and unlocked configurations;*

*wherein the adjustment assembly further comprises a selector element operatively connected to the at least one selector for moving the at least one selector to retain a selected number of weight plates, wherein movement of the selector element from a first selector element position to a second selector element position causes movement of the selector from a first selector position to a second selector position, wherein movement of the selector element to advance the at least one selector to a selected weight plate aligns the first locking element with one of the plurality of recesses associated with the selected weight plate, wherein the adjustment assembly and the locking assembly are adapted and configured to prevent, when the first locking element is engaged with any of the plurality of recesses, movement of the selector element from the first selector element position to the second selector element position and movement of the selector from the first selector position to the second selector position, wherein the adjustment assembly and the locking assembly are adapted and configured to allow, when the first locking element is disengaged with the plurality of recesses, movement of the selector element from the first selector element position to the second selector element position and movement of the selector from the first selector position to the second selector position.*

*32. A handle assembly for a selectable weight set apparatus comprising:*

*a handle for supporting a plurality of weight plates;*

*an adjustment assembly associated with the handle for selecting a number of weight plates to be retained to the handle, the adjustment assembly comprising at least one selector shaft for movement lengthwise of the at least one selector shaft relative to the handle to engage and select the weight plates to be retained to the handle; and*

*a locking assembly for fixing the at least one selector shaft relative to the handle, the locking assembly comprising an actuator shaft and a plurality of locking structures on the at least one selector shaft, the actuator shaft being linearly movable relative to the at least one selector shaft to engage and disengage the locking structures on the at least one selector shaft to place the locking assembly in locked and unlocked configurations;*

*wherein the actuator shaft is operatively cooperative with the at least one selector shaft to retain a selected number of weight plates, wherein the adjustment assembly and the locking assembly are adapted and configured to prevent, when the actuator shaft is engaged with any of the plurality of locking structures, movement of the selector shaft from a first selector shaft position to a second selector shaft position, and wherein the adjustment assembly and the locking assembly are adapted and configured to allow, when the actuator shaft is disengaged with the plurality of locking structures, movement of the selector shaft from the first selector shaft position to the second selector shaft position.*

* * * * *